F. GOEBEL.
FREE WHEEL BACK PEDALING BRAKE.
APPLICATION FILED MAY 19, 1910.
1,023,076.
Patented Apr. 9, 1912.
2 SHEETS—SHEET 1.
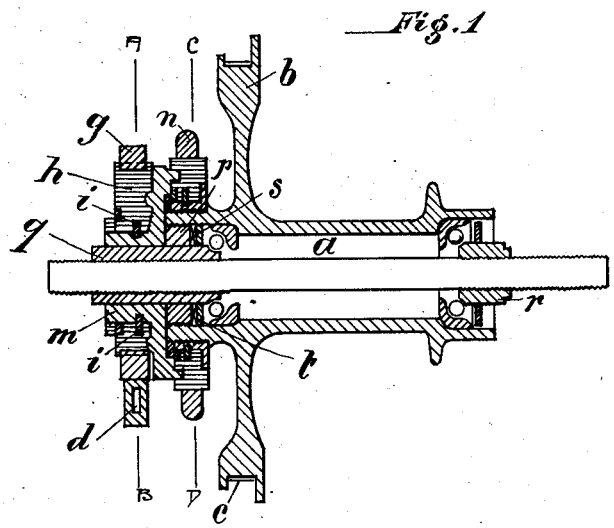
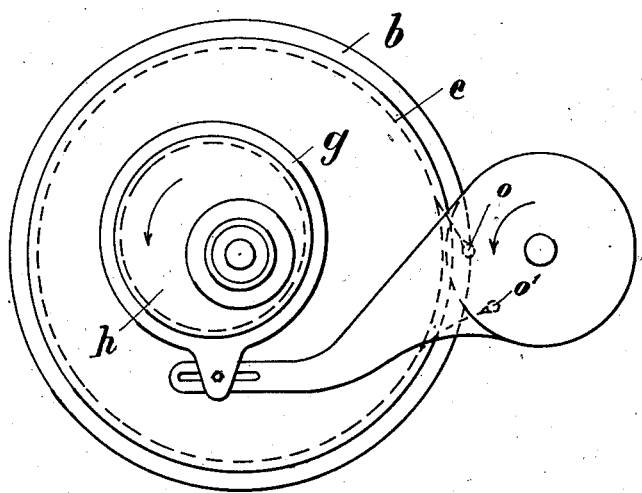
Witnesses:
Kenneth Romanes
E. Berkers-Schuin
Inventor:
Franz Goebel
by Paul E. Schilling
Attorney.
COLUMBIA PLANOGRAPH CO., WASHINGTON, D. C.

F. GOEBEL.
FREE WHEEL BACK PEDALING BRAKE.
APPLICATION FILED MAY 19, 1910.
1,023,076.
Patented Apr. 9, 1912.
2 SHEETS—SHEET 2.
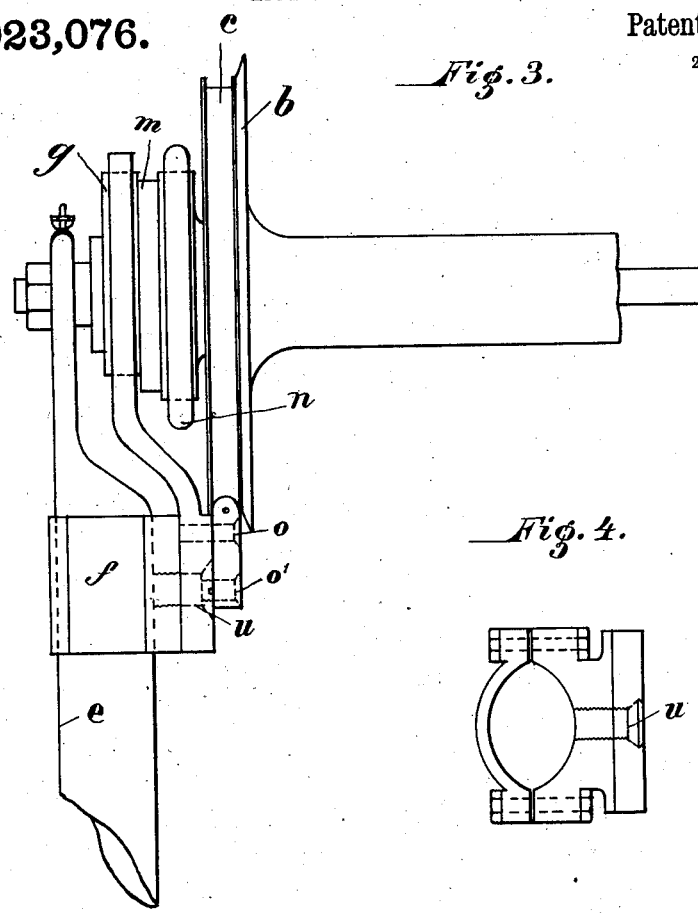
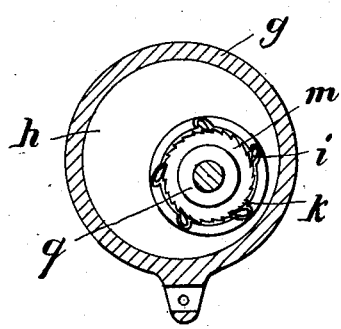
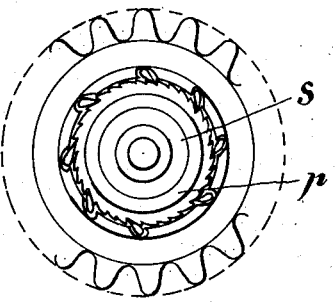

UNITED STATES PATENT OFFICE.

FRANZ GOEBEL, OF HANN-MÜNDEN, GERMANY.

FREE-WHEEL BACK-PEDALING BRAKE.

1,023,076.   Specification of Letters Patent.   Patented Apr. 9, 1912.

Application filed May 19, 1910. Serial No. 562,145.

*To all whom it may concern:*

Be it known that I, FRANZ GOEBEL, a subject of the German Emperor, and residing at Hann-Münden, Province of Hanover, German Empire, have invented certain new and useful Improvements in Free-Wheel Back-Pedaling Brakes, of which the following is a specification.

My invention relates to improvements in free-wheel back-pedaling brakes.

In prior brakes of this class mechanism is provided inside the hub of the rear wheel of the cycle. Owing to the lever arm having thus to be extremely short, such devices require the application of very considerable power on braking and are therefore subject to excessive wear and tear.

According to my invention I employ a relatively long lever arm, located outside the hub of the rear wheel, in conjunction with a brake wheel, furnished with a band, which can be readily renewed when worn. With such mechanism considerably less power is required for the same degree of braking and the wear of the parts is thus considerably reduced. This renders the device particularly suitable for ladies' and children's cycles.

An embodiment of the invention is illustrated in the accompanying drawings, in which—

Figure 1 is a section, Fig. 2 a side elevation, and Fig. 3 a plan. Fig. 4 is a detail view, showing the fork clamp. Fig. 5 is a section on the line A—B of Fig. 1. Fig. 6 is a section on the line C—D of Fig. 1.

The hub $a$ of the rear wheel is provided with a brake wheel $b$, for a brake band $c$.

The brake lever $d$ is secured to the rear fork tube $e$ by a clamp $f$, having a pin or screw $u$, on which the lever $d$ can turn when elevated or depressed by the eccentric strap $g$, to which it is suitably connected.

The eccentric $h$ of the strap $g$ receives its motion by means of loose pawls or tongues $i$, which engage with teeth $k$ presented by a member $m$. This latter is screwed into the free toothed-rim $n$, which may be of familiar construction. Thus when back-pedaling takes place, the part $m$ is rotated backward by the rim $n$, and owing to the engagement between the teeth $k$ and pawls $i$ the eccentric $h$ is actuated, so that its strap $g$ depresses the lever $d$. The latter is furnished with pins or screws $o$, $o^1$, which hold the ends of the brake band $c$. On depression of the lever $d$ by the strap $g$ the pins $o$, $o^1$ travel in the direction of the arrow (Fig. 2), so that a pull is exerted on both ends of the brake band $c$ simultaneously, that is to say, the band is tightened upon its wheel $b$ both from above and below, wherefore the brake is, as it were, double acting.

$p$, is a screw disk, covering the felt ring $s$ and the washer $t$, whereby the access of dust to the ball bearing is prevented. $q$, $r$ are the usual race-cones, which like the rest of the bearing may be of any approved construction.

Having thus described my invention, I declare that what I claim as new and desire to secure by Letters Patent is—

In a free-wheel back-pedaling brake, in combination, an axle, a hub mounted thereon, a brake-wheel on the hub, a free toothed-rim, means for transmitting forward motion of the latter to the hub, an eccentric on the axle, means for transmitting backward motion of the rim thereto, a strap on the eccentric, a lever adapted to be pivoted to the cycle frame and connected to the strap, and a band passing around the brake-wheel and having its ends attached to the lever at two points equidistant from its fulcrum; whereby on back-pedaling the eccentric strap depresses the lever and causes the band to be drawn tight upon its wheel both from above and below; substantially as described.

In testimony whereof I affix my signature in presence of two witnesses.

FRANZ GOEBEL. [L. S.]

Witnesses:
HEINRICH WÖNNER,
F. G. WILHELM.

Copies of this patent may be obtained for five cents each, by addressing the "Commissioner of Patents, Washington, D. C."